(12) United States Patent
Hannig (10) Patent No.: US 11,021,880 B2
(45) Date of Patent: Jun. 1, 2021

(54) DECORATIVE PANEL AND METHOD FOR PRODUCING SAME

(71) Applicant: AKZENTA PANEELE + PROFILE GMBH, Kaisersesch (DE)

(72) Inventor: Hans-Jürgen Hannig, Bergisch Gladbach (DE)

(73) Assignee: Akzenta Paneele + Profile GMBH, Kaisersesch (DE)

(*) Notice: Subject to any disclaimer, the term of this patent is extended or adjusted under 35 U.S.C. 154(b) by 79 days.

(21) Appl. No.: 15/781,320

(22) PCT Filed: Dec. 5, 2016

(86) PCT No.: PCT/EP2016/079753
§ 371 (c)(1),
(2) Date: Jun. 4, 2018

(87) PCT Pub. No.: WO2017/097705
PCT Pub. Date: Jun. 15, 2017

(65) Prior Publication Data
US 2018/0363304 A1    Dec. 20, 2018

(30) Foreign Application Priority Data

Dec. 7, 2015    (EP) .................................. 15198242

(51) Int. Cl.
*B32B 3/00* (2006.01)
*E04F 13/08* (2006.01)
(Continued)

(52) U.S. Cl.
CPC ............ *E04F 13/0866* (2013.01); *B32B 3/30* (2013.01); *B32B 21/04* (2013.01); *B32B 27/08* (2013.01);
(Continued)

(58) Field of Classification Search
CPC ..... E04F 13/0866; E04F 13/07; E04F 13/075; E04F 13/077; E04F 15/10; E04F 15/105;
(Continued)

(56) References Cited

U.S. PATENT DOCUMENTS 8,919,063 B2    12/2014   Oldorff
2002/0059762 A1*   5/2002  Takeuchi .................. B44C 5/04
                                                52/311.1
(Continued)

FOREIGN PATENT DOCUMENTS

DE    102005023661 A1    11/2006
DE    102005042658 B3     3/2007
(Continued)

OTHER PUBLICATIONS

Machine Translation of WO 2014/029887 (Year: 2014).*
Clemons, "Wood-Plastic Composites in the United States", Jun. 2002, Forest Products Journal, vol. 52, No. 6, pp. 10-18 (Year: 2002).*

*Primary Examiner* — Zachary M Davis
(74) *Attorney, Agent, or Firm* — Harness, Dickey & Pierce, P.L.C.

(57) ABSTRACT

The present disclosure relates to a decorative panel, comprising a layered structure with a plate-shaped carrier on which there are provided a decorative substrate and a decorative layer applied to the decorative substrate, wherein the decorative panel further comprises in its layered structure at least one protective layer applied to the decorative layer, wherein the decorative panel comprises in its layered structure at least one stability layer, wherein the stability layer contains polyurethane, and wherein the stability layer has a density of >0.8 g/cm³. Such a decorative panel can particularly have improved stability.

12 Claims, 3 Drawing Sheets

(51) Int. Cl.
  *B32B 3/30* (2006.01)
  *E04F 15/10* (2006.01)
  *B32B 27/08* (2006.01)
  *B32B 27/40* (2006.01)
  *B32B 21/04* (2006.01)

(52) U.S. Cl.
  CPC ............ *B32B 27/40* (2013.01); *E04F 15/107* (2013.01); *B32B 2255/08* (2013.01); *B32B 2255/26* (2013.01); *B32B 2307/72* (2013.01); *B32B 2451/00* (2013.01)

(58) Field of Classification Search
  CPC ......... B32B 21/04; B32B 21/08; B32B 21/06; B32B 21/02; C09D 175/00; C09D 175/02; C09D 175/04; C09D 175/06; C09D 175/08; C09D 175/10; C09D 175/12; C09D 175/14; C09D 175/16
  See application file for complete search history.

(56) References Cited

U.S. PATENT DOCUMENTS

| | | | |
|---|---|---|---|
| 2009/0280329 A1* | 11/2009 | Rukavina | C08G 18/12 428/412 |
| 2010/0310893 A1* | 12/2010 | Derbyshire | B32B 21/02 428/528 |
| 2011/0245449 A1* | 10/2011 | Boudou | C08G 18/0895 528/58 |
| 2014/0237925 A1 | 8/2014 | Hannig | |
| 2015/0258845 A1 | 9/2015 | Hannig | |
| 2017/0297307 A1* | 10/2017 | Shinmyo | B32B 7/12 |
| 2018/0043669 A1* | 2/2018 | Iriyama | C08J 7/04 |

FOREIGN PATENT DOCUMENTS

| | | | |
|---|---|---|---|
| DE | 202011107844 U1 | 2/2013 | |
| WO | WO-2014029887 A1 * | 2/2014 | ......... B41M 5/0011 |
| WO | WO-2014041128 A1 | 3/2014 | |

* cited by examiner

DECORATIVE PANEL AND METHOD FOR PRODUCING SAME

CROSS-REFERENCE TO RELATED APPLICATIONS

This application is a National Stage of International Application No. PCT/EP2016/079753 filed on Dec. 5, 2016, and published in German as WO2017/097705 A1 on Jun. 15, 2017. This application claims the priority to European Patent Application No. 15198242.8, filed on Dec. 7, 2015. The entire disclosures of the above applications are incorporated herein by reference.

FIELD

The present disclosure relates to a decorative panel. The present disclosure further relates to a method for producing such a decorative panel. Such a decorative panel enables, for example, an increased stability.

BACKGROUND

This section provides background information related to the present disclosure which is not necessarily prior art.

The term decorative panel in the sense of the disclosure means wall, ceiling, door or floor panels comprising a decoration applied onto a carrier plate. Decorative panels are used in a variety of ways both in the field of interior design of rooms and for decorative claddings of buildings, for example in exhibition stand construction. One of the most common application fields of decorative panels is their use as a floor covering. Herein, the decorative panels often comprise a decoration intended to replicate a natural material.

Heretofore, such decorative panels have often been produced as laminates in which a decorative paper preprinted with a desired decoration is applied onto a carrier plate and in turn a so-called overlay is applied onto the decorative paper. Alternatively, the decoration can be applied directly onto a carrier or onto a printing subsurface applied thereto instead of on a decorative paper. For example, the decoration can be applied by direct printing.

From document DE 10 2005 042 658 B3, for example, a construction panel, in particular a floor panel made of a wood-based material, is known. Such a construction panel comprises a top side, a bottom side, a connecting means and peripheral side surfaces. Here, it is provided that at least one side surface and at least one connecting means are provided with a decoration in addition to the top side. Furthermore, this document discloses that a finishing layer of polyurethane is applied onto the decoration.

Document DE 10 2005 023 661 A1 further describes a floor panel comprising an upper decorative and abrasion resistant layer, an intermediate damping layer and a supporting core. The intermediate dampening layer is attached to the core and the decorative and abrasion resistant layer by use of an adhesive and may be formed, for example, of polyurethane.

However, there is still room for improvements with regard to the layer sequence and the configuration of the respective layers of a decorative laminate.

SUMMARY

This section provides a general summary of the disclosure, and is not a comprehensive disclosure of its full scope or all of its features.

In this respect, it is the object of the present disclosure to provide a decorative panel and a method for producing a decorative panel, which at least partially enable to overcome at least one problem known from the prior art. In particular, it is the object of the present disclosure to provide a decorative panel and a method for producing a decorative panel, which has an improved stability.

This object is achieved by a decorative panel according to claim 1 and by a method according to claim 14. Preferred embodiments of the disclosure are specified in the dependent claims and in the further description, wherein the further described features individually or in any combination may be part of the disclosure inasfar the contrary is not explicitly derived from the context.

According to the disclosure, a decorative panel is proposed comprising a layered structure with a plate-shaped carrier, on which a decoration substrate and a decorative layer applied on the decoration substrate are provided, wherein the decorative panel further comprises in its layered structure at least one protective layer applied onto the decorative layer. Herein, it is provided that the decorative panel comprises at least one stability layer in its layered structure, wherein the stability layer comprises polyurethane, and wherein the stability layer has a density of >0.8 g/cm$^3$.

A stability layer in the context of the present disclosure means in particular a layer which is able to improve at least one stability characteristic of the decorative panel compared to an embodiment without a corresponding stability layer. For example, by means of the stability layer the abrasion resistance can be improved or the dimensional stability of the panel can be improved or the adhesion of the decoration can be improved.

The term "decorative wall or floor panel" or "decorative panel" in the sense of the disclosure means in particular wall, ceiling, door or floor panels comprising a decoration replicating a decorative template applied onto a carrier plate. Decorative panels are used in a variety of ways both in the field of interior design of rooms and for decorative claddings of buildings, for example in exhibition stand construction. One of the most common application fields of decorative panels is their use as floor covering. Herein, the decorative panels often comprise a decoration intended to replicate a natural material.

Examples of such replicated natural materials are wood species such as maple, oak, birch, cherry, ash, walnut, chestnut, wenge or even exotic woods such as Panga-Panga, mahogany, bamboo and bubinga. In addition, often natural materials such as stone surfaces or ceramic surfaces are replicated.

Accordingly, a "decoration template" in the sense of the present disclosure in particular means such an original natural material or at least a surface of such a material which is to be imitated or replicated by the decoration.

The term "carrier" may in particular mean a layer serving as a core or a base layer in a finished panel which may in particular comprise a natural material, such as a wood-based material, a fiber material or a material comprising a plastic material. For example, the carrier may already impart an appropriate stability to the panel or contribute thereto.

Here, as a "web-like carrier" a carrier can be understood which for example in its production process has a web-like shape and therefore has a significantly greater length compared to its thickness or width and which length may be, for example, greater than 15 meters.

The term "plate-shaped carrier" in the sense of the present disclosure may be understood as a carrier, which is formed from the web-like carrier by separation and is formed in the shape of a plate. Moreover, the plate-shaped carrier may already define the shape and/or size of the panel to be produced. However, the plate-shaped carrier can also be provided as a large plate. A large plate in the sense of the disclosure is in particular a carrier whose dimensions several times exceed the dimensions of the final decorative panels, and which in the course of the manufacturing process is separated in a corresponding plurality of decorative panels, for example by sawing, laser or water jet cutting. For example, the large plate may correspond to the web-like carrier.

A decorative panel according to the present disclosure has a layered structure or is formed from this layered structure. Thus, the decorative panel includes a plurality of layers attached to one another and arranged successively.

It should be principally noted that the presence of a layer on another layer or the application of a layer onto another layer may mean that the layer can be present or applied directly on the further layer or may be present or applied on the further layer by use of one or more intermediate layers.

A first layer of the layered structure, which may be, for example, the lowest layer, is a plate-shaped carrier. The plate-shaped carrier can be configured in a manner known per se for the production of decorative panels. Depending on the desired field of application of the decorative panels, the carrier may be made of different materials. For example, the carrier can consist of or comprise a wood-based material, provided that the decorative panel is not subjected to excessive moisture or weather conditions. On the other hand, if the panel is to be used e.g. in wet rooms or outdoors, the carrier may for example consist of or comprise a plastic material, for example, may be constructed of a WPC material.

"Wood-based materials" in the sense of the disclosure in addition to solid wood materials are also materials such as cross-laminated timber, glue-laminated timber, blockboard, veneered plywood, laminated veneer lumber, parallel strand lumber and bending plywood. In addition, wood-based materials in the sense of the disclosure are also chipboards such as pressboards, extruded boards, oriented structural boards (OSB) and laminated strand lumber as well as wood fiber materials such as wood fiber insulation boards (HFD), medium hard and hard fiberboards (MB, HFH) and in particular medium density fiberboards (MDF) and high density fiberboards (HDF). Even modern wood-based materials such as wood polymer materials (wood plastic composite, WPC), sandwich boards made of a lightweight core material such as foam, rigid foam or honeycomb paper and a layer of wood applied thereto, and minerally hardened, for example with cement, chipboards are wood-based materials in the sense of the disclosure. Moreover, cork represents a wood-based material in the sense of the disclosure.

Plastic materials which can be used in the production of corresponding panels are, for example, thermoplastics, such as polyvinyl chloride, polyolefins (for example polyethylene (PE), polypropylene (PP)), polyamides (PA), polyurethanes (PU), polystyrene (PS), acrylonitrile-butadiene-styrene (ABS), polymethyl methacrylate (PMMA), polycarbonate (PC), polyethylene terephthalate (PET), polyetheretherketone (PEEK) or mixtures or copolymers thereof. For example, a copolymerizate of polyethylene and polypropylene, for example, in a ratio of 1/1 can be used. Further, by way of example, a wood material and a polymer may be suitable, which may be present in a ratio of 40/60 to 70/30, for example 50/50. As the polymer components polypropylene, polyethylene or a copolymer of the two aforementioned materials may be used, wherein furthermore wood flour can be used as wood component. The plastic materials may in principle contain conventional fillers, for example calcium carbonate (chalk), aluminum oxide, silica gel, quartz flour, wood flour, gypsum. Moreover, they can be colored in a known manner.

On the carrier a decoration substrate is provided, which in particular can serve to allow an improved decorative image and/or to improve the adhesion of the decoration on the carrier. Preferably, a primer, in particular for printing processes, may first be applied as a decoration substrate, for example in a thickness of $\geq 10$ μm to $\leq 60$ μm. Here, as a primer a liquid radiation curing mixture based on a urethane or a urethane acrylate, optionally with one or more of a photoinitiator, a reactive diluent, a UV stabilizer, a rheology agent such as a thickener, a radical scavenger, flow agents, defoamers or preservatives, a pigment and/or a dye may be used.

In addition to the use of a primer it is possible to apply the decoration onto a decorative paper printable with a corresponding decoration, which may be provided for example by means of a resin layer as bonding agent previously applied to the carrier. Such a decoration substrate is suitable for flexographic printing, offset printing or screen printing processes and in particular for digital printing techniques such as inkjet processes or laser printing processes. For the application of the resin layer it may be preferably provided that a resin composition is applied which as a resin component includes at least one compound selected from the group consisting of melamine resin, formaldehyde resin, urea resin, phenol resin, epoxy resin, unsaturated polyester resin, diallyl phthalate or mixtures thereof. The resin composition may, for example, be applied at a coverage between $\geq 5$ g/m$^2$ and $\leq 40$ g/m$^2$, preferably $\geq 10$ g/m$^2$ and $\leq 30$ g/m$^2$. Further, a paper or a non-woven fabric with a grammage between $\geq 30$ g/m$^2$ and $\leq 80$ g/m$^2$, preferably between $\geq 40$ g/m$^2$ and $\leq 70$ g/m$^2$ may be applied onto the plate-shaped carrier.

As a further layer of the layered structure or of the layered composite a decorative layer applied to the decoration substrate may be provided. For example, the decorative layer may comprise a printing layer or be configured thereof, for example, may consist thereof. As such, the decorative layer may be applied by means of a direct printing process. In the sense of the disclosure, the term "direct printing" refers to the application of a decoration directly onto the carrier of a panel or onto a fiber material layer applied onto the carrier, in particular a non-printed fiber material layer or another decoration substrate. In contrast to conventional methods, in which a decorative layer previously printed with a desired decoration is applied onto a carrier, in direct printing the printing of the decoration takes place directly in the course of the surface coating or the panel production. Here, various printing techniques, such as flexographic printing, offset printing or screen printing can be used. In particular, digital printing techniques such as, for example, inkjet methods or laser printing methods can be used.

Preferably, for the application of the decorative layer, in particular by means of direct printing, a radiation curable paint and/or ink is used. Radiation curable in the sense of the disclosure means that the paint and/or ink is cured by use of electromagnetic radiation, such as UV radiation or electron radiation. It may be provided in particular that the paint and/or ink comprises corresponding radiation or photoinduced polymerizing components. Examples of suitable components are acrylates, epoxides or cyclic amines, such as ethyleneimine.

The decorative layer may be applied, for example, in a thickness in a range of ≥5 µm to ≤10 µm.

It can also be provided to apply in addition to a positive image with regard to the color and/or texture also a corresponding negative image of the decorative template. In detail, as is known, for example, from positive staining or negative staining of wood-based materials the color impression for example of a grain can be reversed by the use of digital data, such that a negative is obtained with respect to the color or in particular lighter and darker areas. In addition to the color impression corresponding results can also be obtained for the applied structure, such that also with respect to the structural design a negative can be realized. Even such effects can be integrated easily based on digital three-dimensional data and without lead-time or refittings in a manufacturing process.

In particular for the protection of the applied decorative layer, it may further be provided that the layered structure or the decorative panel comprises at least one protective layer applied to the decorative layer, which can serve as a cover and/or wearing layer. The protective layer in the sense of the disclosure is a layer applied as an outer finish, which in particular protects the decorative layer from wear or damage due to dirt, moisture or mechanical impact, such as abrasion. In particular, applying a protective layer offers a further advantage of the above-described preparation of the decoration substrate. In detail, the adhesion of the protective layer onto the printed decoration substrate can be significantly improved, so that a particularly good stability and durability are enabled and, moreover, chipping in a compressing process for introducing a structure can be prevented.

In this regard it can be provided that a surface structure matching with the decoration is formed within the protective layer. A surface structure matching with the decorative surface means that the surface of the decorative panel has a haptically perceptible structure, which with respect to its shape and pattern corresponds to the applied decoration in order to achieve a reproduction of a natural material as close to the original as possible even with respect to the haptic. It can be provided that the carrier plate already has a structuring and an alignment of a printing tool for applying the decoration and the carrier plate relative to each other is carried out depending on the structuring detected by means of optical methods. For the alignment of the printing tool and the carrier plate relative to each other it may be provided that a relative movement between the printing tool and the carrier plate relative to each other necessary for the alignment is effected by a displacement of the carrier plate or by a displacement of the printing tool.

Furthermore, it may be provided that a structuring of the decorative panels is implemented after the application of the protective layer. For this purpose, it may be preferably provided that as a protective layer a curable composition is applied and a curing process is carried out only to the extent that only a partial curing of the top and/or wearing layer occurs. In the thus partially cured layer a desired surface structure is embossed by means of suitable tools, such as a hard metal structure roller or a die or a press such as a short contact press. Herein, the embossing process is preferably carried out in accordance with the applied decoration, as described above.

In addition, it can be provided that the protective layer is applied as a lacquer, for example as a radiation curable or at least partially radiation curable composition, for example based on an acrylate lacquer, an epoxy lacquer or a urethane acrylate. In this case, it may be particularly preferred that the composition after application onto the decorative layer is only partially cured radiation induced in a first step and into the partially cured layer in the manner described above a surface structuring matching with the decoration is introduced.

For example, it may be provided that two protective layers are provided, or that the protective layer is configured in two layers. The layers may be made of the same material, in particular lacquer, or of different materials, in particular of different lacquers. A suitable lacquer can for example be a UV curing lacquer, such as an acrylic lacquer or an acrylic-based lacquer. In this case, a lower protective layer may have a structure and the upper protective layer may cover the lower protective layer. In this configuration, it can be provided that the lower layer has a comparatively higher viscosity during the application in order to be able to hold structures stable even prior to the curing process, and/or that the upper layer has a comparatively low viscosity in order to be able to form a uniform finish. Furthermore, it can be provided that the lower layer has a greater thickness than the upper layer. Thus, the lower layer, which can serve as a structural lacquer, may be applied, for example, in an application amount of ≥30 g/m$^2$ to ≤40 g/m$^2$, whereas the upper layer, which can serve as a topcoat, may be applied in an application amount of about ≥10 g/m$^2$ to ≤15 g/m$^2$.

With regard to the protective layer, it may further be provided that it comprises hard materials, such as titanium nitride, titanium carbide, silicon nitride, silicon carbide, boron carbide, tungsten carbide, tantalum carbide, alumina (corundum), zirconium oxide or mixtures thereof, in order to increase the wear resistance of the layer. Here, it can be provided that the hard material is included in an amount between 5 wt.-% and 40 wt.-%, preferably between 15 wt.-% and 25 wt.-% in the protective layer composition. Preferably, the hard material has an average particle diameter between 10 µm and 250 µm, more preferably between and 10 µm and 100 µm. As a result, it is advantageously achieved that the protective layer composition forms a stable dispersion and a segregation or precipitation of the hard material in the protective layer composition can be avoided. In order to form a corresponding protective layer, it is provided in one embodiment of the disclosure that the hard material containing and radiation curable composition is applied in a concentration between 10 g/m$^2$ and 300 g/m$^2$, preferably between 50 g/m$^2$ and 250 g/m$^2$. In this case, the application can be carried out for example by means of rollers, such as rubber rollers, or by means of pouring devices. In a further embodiment of the disclosure it can be provided that the hard material is not included in the composition at the time of application of the wearing layer composition but is scattered as particles onto the applied wearing layer composition and the layer is subsequently cured.

In addition to the aforementioned layers, it is provided in a decorative panel that the decorative panel has at least one stability layer in its layered structure, wherein the stability layer comprises polyurethane and has a density of >0.8 g/cm$^3$. For example, polyurethane having a density of >0.8 g/cm$^3$ may be used to form the stability layer. In particular, by providing such a stability layer significant advantages can be obtained compared to solutions known from the prior art.

In detail, the layered structure thus comprises at least one layer which includes polyurethane of a defined density and can consist, for example, thereof and which is intended to serve as a stability layer in the present layered structure. This layer should thus provide an increased stability to the layered structure and thus the decorative panel compared to a comparable layered structure without such a stability layer.

It has surprisingly been found that the stability layer is particularly effective in particular in that the stability layer has a density of >0.8 g/cm$^3$. The respective stability properties can, in addition to the specific design of the stability layer and, for example, to the use of polyurethane, in particular be achieved by the positioning of the stability layer.

In principle, the stability layer due to its configuration of polyurethane with a density in a range of >0.8 g/cm$^3$ enables, for example, that the decorative panel as a whole is provided with an increased stability.

In principle, the stability layer can in particular provide a high mechanical stability, which can result, for example, in a high impact and abrasion resistance. Furthermore, due to the increased stability the handling of such decorative panels can be simplified. In addition, a particularly good shelf life can be realized.

The design of polyurethane can also result in a simple and inexpensive producibility. In particular when using polyurethane, the application of the stability layer, for example, can be done by liquid application, i.e. for example by applying a melt, which can enable a simple and defined application. In addition, by means of such an application from the melt it is possible to achieve a particular simple and uniform application even for comparatively high densities of the polyurethane.

In particular, in the case in which the stability layer consists of polyurethane, thus, a particular simple and defined formation of the stability layer can be achieved.

For example, the stability layer, especially if made of polyurethane, may be formed by an application amount ranging from ≥40 g/m$^2$ to ≤70 g/m$^2$, for example from ≥50 g/m$^2$ to ≤60 g/m$^2$. Accordingly, the stability layer may have an exemplary thickness of about 0.4 mm, wherein the thickness in an understandable way depends on the density and the application amount.

With regard to the density of the polyurethane or the stability layer, it may furthermore be particularly preferred that the stability layer has a density in a range from ≥0.9 g/cm$^3$ to ≤2 g/cm$^3$, in particular in a range from ≥1.15 g/cm$^3$ to ≤1.5 g/cm$^3$. For example, a density of ≥1.41 g/cm$^3$ or ≤1.23 g/cm$^3$ may be present. It has surprisingly been found that the effects described above can be particularly effective especially in the above-described density ranges.

Furthermore, it may be advantageous that the polyurethane used has a viscosity in a range from ≥4000 mPas to ≤15000 mPas, for example from ≥6000 mPas to ≤12000 mPas, wherein the abovementioned values being based on a viscosity according to Brookfield HBTD 10 rpm at 140° C., in particular according to ISO 1652:2011.

For example, it may be advantageous that the stability layer consists of a polyurethane layer. In particular, by use of such a configuration the stability properties can be particularly effective. Here, a polyurethane layer can be understood in particular as a layer which besides polyurethane does not include any further intentionally added substances. Optionally, substances present in addition to polyurethane can in particular be substances present in the polyurethane used and thus be dependent on the purity of the product used. For example, substances resulting from the production may be contained, wherein this should be advantageously prevented, in particular in the case of isocyanates. In particular, such substances, such as impurities, may be present in an amount of ≥10% wt.-%, preferably ≤5% wt.-%.

With respect to the stability layer, it may also be advantageous that the polyurethane is based on hexamethylene diisocyanate as a structural element. In particular, it may be provided that the polyurethane of the stability layer is based on hexamethylene-1,6-diisocyanate as a structural element. The term "based on a structural element" means in particular that the polyurethane has been produced by use of this substance. It has surprisingly been found that the above-described advantageous stability effects can occur particular effective in particular in this embodiment.

It may also be advantageous that the polyurethane of the stability layer has a melting point or softening point of ≤150° C., wherein the abovementioned value can be determined by the so-called "ring and ball method", for example in accordance with ISO 46251:2004. For example, the melting point or softening point can be in a range of ≤120° C., wherein the lower limit may be determined by the field of application. In this embodiment a particularly advantageous producibility of the layered structure and thus the decorative panel is enabled. In particular, in this embodiment it can be enabled that the stability layer can be applied onto the underlying layer by melt application. In this case, low application temperatures are enabled due to the low melting point or softening point, which permits a simple process control and, moreover, can minimize or preclude the risk of temperature induced damage of the underlying layer.

It may further be preferred that at least one stability layer is disposed between the decoration layer and the protective layer. It has surprisingly been shown that by providing the stability layer between the decorative layer and the protective layer abrasion values of the decorative panel can be further increased, so that the long-term stability can also be increased. Here, it can also be enabled that the protective layer has a particularly good adhesion at the layered structure, whereby the stability of the decorative panel can be further increased. Thus, the decorative panel, in particular in this embodiment can enable a particularly high long-term stability even with adverse external influences.

In addition, a stability layer between the decorative layer and the protective layer can be characterized in that in particular by the comparatively high density of the stability layer structures can be imprinted into these structures. Thus, a structuring by introducing structures replicating a decorative template needs not to be limited to the cover layer but may rather be continued into the stability layer or may be present only in the stability layer. Therefore, it may be particularly advantageous that the stability layer is provided with a structuring, wherein in particular the structuring of the stability layer and the cover and/or wearing layer can replicate a decorative template. In this embodiment, the protective layer can thus be comparatively thin, which can result in procedural advantages.

It may also be advantageous that at least one stability layer is disposed between the carrier and the decorative layer. In this embodiment, an improved adhesion of the decorative layer can be enabled, which can also have a positive effect on the stability. Thus, it can be prevented, for example, that e.g. during the production of the decorative panel, such as in a structuring of the cover layer by means of a press, the effect occurs that the cover layer does not adhere sufficiently to the substrate and thus the surface is damaged. Thus, it can be enabled in this embodiment, that a layered structure can be produced which allows an excellent print image and brings about further procedural advantages.

With respect to the plate-shaped carrier, it may also be advantageous that it comprises a wood-based material, in particular a wood-plastic composite material (WPC material). For example, the carrier or the carrier plate can be formed at least partially from a thermoplastic, elastomeric or duroplastic plastic material. In addition, recycling materials from the abovementioned materials can be used in the context of the method according to the disclosure. Here, as a plate material, such as in conjunction with a WPC material or a pure plastic material, in particular thermoplastic plastics, such as polyvinyl chloride (PVC), polyolefins (for example polyethylene (PE), polypropylene (PP)), polyamides (PA), polyurethane (PU), polystyrene (PS), acrylonitrile-butadiene-styrene (ABS), polymethyl methacrylate (PMMA), polycarbonate (PC), polyethylene terephthalate (PET), polyetheretherketone (PEEK) or mixtures or co-polymers thereof may be preferred.

In this case, irrespective of the base material of the carrier, however, in particular with use of PVC, plasticizers may be present in a range of >0 wt.-% to ≤20 wt.-%, in particular ≤10 wt.-%, preferably ≤7 wt.-%, for example in a range of ≥5 wt.-% to ≤10 wt.-%. A suitable plasticizer comprises for example the plasticizer sold under the trade name "Dinsch" by the company BASF. Further as a substituent for conventional plasticizers copolymers such as acrylates or methacrylates may be provided. Moreover, in this embodiment the carrier can be cooled down to a temperature below the melting point of the plastic component within or upstream of the twin belt press.

In particular, thermoplastics offer the advantage that the products made from them can be easily recycled. It is also possible to use recycling materials from other sources. This offers a further possibility to reduce the manufacturing costs.

Such carriers are very elastic or resilient which allows a comfortable feeling in walking and also enables to reduce the noise occurring during walking compared to conventional materials, so that an improved footstep sound insulation can be realized.

In addition, the aforementioned carriers offer the advantage of good water resistance, because they have a degree of swelling of 1% or less. This in a surprising way besides pure plastic carriers also applies to WPC materials, as is explained in detail below.

For a pure plastic carrier, for example, polyvinyl chloride may be advantageous.

In a particularly advantageous manner the carrier material may comprise wood-polymer materials (Wood Plastic Composite, WPC) or consist thereof. Here, as an example a wood-based material and a polymer may be suitable, which can be present in a ratio of 40/60 to 70/30, such as 50/50. As polymeric components polypropylene, polyethylene or a copolymer of the two aforementioned materials can be used, wherein further wood flour may be used as a wooden component. Such materials offer the advantage that they can be already formed to a carrier at low temperatures, such as in a range of ≥180° C. to ≤200° C., in the process described above such that a particularly effective process control with exemplary line speeds in a range of 6 m/min in is enabled. For example, for a WPC product with a ratio of 50/50 of the wood and the polymer components an exemplary product thickness of 4.1 mm is possible, which allows a particularly effective production process.

Further, in this way very stable panels can be produced which moreover have a high elasticity which may in particular be advantageous for an effective and cost-efficient configuration of connecting elements at the edge region of the carrier and further with respect to a footstep sound insulation. Furthermore, the aforementioned good water tolerance with a degree of swelling of less than 1% is enabled in such WPC materials. Herein, WPC materials may, for example, comprise stabilizers and/or other additives which preferably may be present in the plastic component.

In the case of plastic-based panels, for example based on polyvinyl chloride, as well as WPC-based panels, for example based on polypropylene and/or polyethylene, mineral fillers may be advantageous. Here, talcum or talc or calcium carbonate (chalk), aluminum oxide, silica gel, silica flour, wood flour and gypsum are particularly suitable. For example, chalk may be provided. The proportion of mineral fillers, such as talcum, can be in a range from ≥30 wt.-% to ≤80 wt.-%, for example, from ≥45 wt.-% to ≤70 wt.-%. By use of fillers, in particular by use of chalk, the slip of the carrier can be improved. For example, the use of talcum may enable an improved heat resistance and moisture resistance. Moreover, the fillers can be colored in a known manner. For example, a mixture of talcum and polypropylene can be provided in which the talcum is present in the abovementioned range of amounts, such as 60 wt.-%. In particular, it can be provided that the plate material comprises a flame retardant.

According to a particularly preferred embodiment of the disclosure the carrier material consists of a mixture of a PE/PP block copolymer and wood. Herein, the proportion of the PE/PP block copolymer and the proportion of wood can range between ≥45 wt.-% and ≤55 wt.-%. Furthermore, the carrier material can comprise between ≥0 wt.-% and 10 wt.-% of other additives such as flow agents, thermostabilizers or UV stabilizers. Here, the particle size of the wood is between >0 μm and ≤600 μm with a preferred particle size distribution of D50≥400 μm. In particular, the carrier material may comprise wood with a particle size distribution of D10≥400 μm. The particle size distribution is based on the volumetric diameter and refers to the volume of the particles.

According to a further preferred embodiment of the disclosure the carrier material consists of a mixture of a PE/PP polymer blend and wood. Here, the proportion of PE/PP polymer blend as well as the proportion of wood can be in a range between ≥45 wt.-% and ≤55 wt.-%. Furthermore, the carrier material can comprise between ≥0 wt.-% and ≤10 wt.-% of other additives such as flow agents, thermostabilizers or UV stabilizers. Here, the particle size of the wood is between >0 μm and 600 μm with a preferred particle size distribution of D50≥400 μm. In particular, the carrier material may comprise wood with a particle size distribution of D10≥400 μm. The particle size distribution is based on the volumetric diameter and refers to the volume of the particles. Particularly preferably, the carrier material is provided as a granular or pelletized pre-extruded mixture of a PE/PP polymer blend and wood particles with the specified particle size distribution. Here, the granules and/or pellets can preferably have a particle size in a range of ≥400 μm to ≤10 mm, preferably ≥600 μm to ≤10 mm, in particular ≥800 μm to ≤10 mm.

In a further embodiment of the disclosure, the carrier material consists of a mixture of a PP homopolymer and wood. The proportion of the PP homopolymer and the proportion of wood can be in a range between ≥45 wt.-% and ≤55 wt.-%. For example, the constituents wood and polypropylene may be present in a ratio of 0.5:1 to 1:0.5, such as 1:1. Furthermore, the carrier material can comprise between ≥0 wt.-% and ≤10 wt.-% of other additives, such as flow agents, thermostabilizers or UV stabilizers. Here, the particle size of the wood is between >0 μm and ≤600 μm with a preferred particle size distribution of D50≥400 μm. In particular, the carrier material can comprise wood with a particle size distribution of D10≥400 µm. The particle size distribution is based on the volumetric diameter and refers to the volume of the particles. Particularly preferably the carrier material is provided as a granular or pelletized pre-extruded mixture of a PP homopolymer and wood particles of the specified particle size distribution. The granules and/or pellets can preferably have a particle size in the range of ≥400 µm to ≤10 mm, preferably ≥600 µm to ≤10 mm, in particular ≥800 µm to ≤10 mm.

For determining the particle size distribution well-known methods such as laser diffractometry can be used, by means of which particle sizes in the range from a few nanometers up to several millimeters can be determined. Using this method also D50 or D10 values can be determined, according to which 50% and 10%, respectively, of the measured particles are smaller than the specified value.

As indicated above, it may be advantageous that the plate-shaped carrier comprises a mineral material, in particular talcum. For example, it may be provided that the carrier material comprises i) a matrix material which includes a plastic material and ii) a solid material, wherein the solid material consists of talcum to at least 50 wt.-%, in particular at least 80 wt.-%, in particular at least 95 wt.-%, based on the solid material, wherein the matrix material being present in an amount, based on the carrier material, from ≥30 wt.-% to ≤70 wt.-%, in particular from ≥40 wt.-% to ≤60 wt.-%, and wherein the solid material, based on the carrier material, is present in an amount from ≥30 wt.-% to ≤70 wt.-%, in particular from ≥40 wt.-% to ≤60 wt.-%, and wherein the carrier material and the solid material together, based on the carrier material (20), are present in an amount of ≥95 wt.-%, in particular ≥99 wt.-%.

For example, the carrier material may consist of at least one plastic material, talcum, optionally a wood component and optionally an adhesion promoter.

It may also be preferred that talcum is present in the form of particles having a particle size $D_{50}$ in a range from ≥3 µm to ≤6 µm, preferably in a range from ≥4 µm to ≤5 µm and/or that talcum is present in the form of particles having a particle size in the range from ≥10 µm to ≤30 µm, preferably in a range from ≥15 µm to ≤20 µm.

With respect to the matrix material, it may be provided that it comprises polypropylene, wherein the polypropylene may for example comprise a mixture of a homopolymer and a copolymer.

Furthermore, it may be preferred that at least one white layer is disposed in particular between the plate-shaped carrier and the decorative layer. A white layer is to be understood in particular as a layer which can be configured as a colored layer and which is configured in particular white. By providing such a white layer, the appearance of the decoration can give the impression of particular high quality, especially if the decoration is configured as a printed layer. In particular, the color design can be particularly rich in contrast or the colors can be particularly genuine, so that a particularly accurate and detailed replication of a decorative template is possible.

Here, it can be provided that the stability layer forms at least one white layer. In particular, in this embodiment a simple and cost-effective producibility can be achieved, since the advantages of a white layer can be combined with those of a stability layer in only one layer applied, so that possibly a layer can be dispensed with despite the fact that the aforementioned advantages are enabled. This can simplify the production process and save costs. This can be achieved, for example, by adding color pigments to the stability layer or the polyurethane for forming the stability layer.

In a further preferred embodiment of the decorative panel according to the disclosure this comprises a backing layer on the side of the plate-shaped carrier opposite to the decoration. However, it may be further preferred that no backing layer is provided on the side of the plate-shaped carrier opposite to the decoration. Such a backing layer free panel due to the material and production step savings can in particular be produced more cost-efficiently and thus offers not only ecological advantages of resource conservation but also economic benefits.

According to another embodiment of the disclosure the plate-shaped carrier can comprise a profile at least in an edge region. Here, it may be in particular provided that the decoration is applied also in the region of the profile, such that the profiling process is implemented prior to the application of the decorative layer onto the plate-shaped carrier. Alternatively or additionally, a profiling process can also be implemented subsequently to the application of the decorative layer. In profiling in the sense of the disclosure it is provided that by means of suitable machining tools at least in a portion of the edges of the decorative panel a decorative and/or functional profile is introduced. Here, a functional profile, for example, means the introduction of a groove and/or tongue profile in an edge in order to make decorative panels connectable to each other by means of the introduced profiles. A decorative profile in the sense of the disclosure, for example, is a chamfer formed at the edge region of the decorative panel, for example, in order to simulate a joint between two interconnected panels after their connection, such as for example in so-called wide planks.

In partially profiling the decorative panel not all profiles to be provided in the finished panel are produced, but only a part of the profiles, while other profiles are produced in a subsequent step. Thus, it may be provided, for example, that the decorative profile to be provided in a panel, such as a chamfer, is produced in one step, while the functional profile, e.g. groove/tongue, is produced in a subsequent step.

By means of an application of the decoration subsequently to the at least partially profiling of the carrier, for example, by means of the above-described methods, such as direct printing, abrasion or damage of the decoration in the course of the profiling process can be avoided in an advantageous way. Thus, the decoration also in the regions of the profile corresponds in detail to the desired imitation, for example, of a natural material.

With regard to further technical features and advantages of the above-described decorative panel, reference is made to the following description of the method, to the figures and to the description of the figures.

The subject matter of the present disclosure furthermore is a method for producing a decorative panel, comprising the method steps:
  a) providing a plate-shaped carrier;
  b) applying a decoration substrate onto at least a portion of the plate-shaped carrier;
  c) applying a decoration replicating a decorative template onto at least a portion of the decoration substrate;
  d) applying a protective layer onto the decorative layer, wherein the method comprising the further step:
  e) applying a stability layer prior to one of the steps b) to d), wherein the stability layer comprises polyurethane, and wherein the stability layer has a density of >0.8 g/cm$^3$.

By means of the method described above, thus, a decorative panel can be produced which has the advantages as described in detail above with reference to the decorative panel.

In detail, the method comprises with step a) the provision of a plate-shaped carrier. This can basically be realized in known manner, wherein in particular a carrier may be provided which comprises a wood-based material, such as a WPC material.

According to step b), the method comprises the application of a decoration substrate, such as a printing substrate, onto at least a portion of the plate-shaped carrier. The decoration substrate may be, for example, a printing substrate which is configured to be able to carry out, for example, a printing process, such as by means of inkjet printing, for applying the decoration in a particularly advantageous manner. With respect to the details of the applied decoration substrate, reference is made to the above explanations regarding the decorative panel.

Furthermore, in accordance with method step c) a decoration replicating a decorative template can be applied onto at least a portion of the carrier. Here, the decoration may be applied by so-called direct printing. The term "direct printing" in the sense of the disclosure means the application of a decoration directly onto the carrier of a panel or onto an unprinted fiber material layer applied to the carrier or a decoration substrate. Here, different printing techniques such as flexographic printing, offset printing or screen printing may be used. In particular digital printing techniques such as inkjet processes or laser printing processes can be used.

Moreover, the decorative layers may be formed of an in particular radiation curable paint and/or ink. For example, a UV-curable paint or ink can be used.

With regard to further features of the decorative layer, reference is made to the above explanations regarding the decorative panel.

According to method step d) the application of a protective layer onto at least a portion of the decoration may be provided. Such a layer for protecting the applied decoration can be applied in particular as a wearing or cover layer in a subsequent process step above the decorative layer in particular in order to protect the decorative layer from wear or damage by dirt, moisture or mechanical impacts such as abrasion.

With regard to further features of the protective layer, reference is made to the above explanations regarding the decorative panel.

In addition, a backing layer can be applied on the side of the carrier opposite to the decoration side. Advantageously, however, a backing layer can be dispensed with.

Alternatively or additionally, the edge regions of the panel can be structured or profiled, in particular in order to provide detachable connecting elements. In this regard, in the case of a profiling in the sense of the disclosure it can be provided that a decorative and/or functional profile is introduced by means of suitable material removing tools at least in a portion of the edges of the decorative panel. A functional profile means, for example, the introduction of a tongue and/or groove profile in an edge in order to make decorative panels connectable to each other via the introduced profilings. In particular, in the case of tongue and/or groove profiles, elastic materials are advantageous, since by means of these only profiles can be produced which are particularly easy to handle and stable. In particular, no further materials are necessary to produce the connecting elements.

In accordance with method step e) furthermore a stability layer is applied prior to one of the steps b) to d), wherein the stability layer comprises polyurethane, and wherein the stability layer has a density of $>0.8$ g/cm$^3$.

By providing such a stability layer it can be achieved that the stability of the decorative panel is significantly improved.

It may be provided that the stability layer is applied between the carrier and the decorative layer. Furthermore, it can be provided that the stability layer is applied between the decorative layer and the protective layer.

Regardless of the exact position, it may be advantageous that the application of the stability layer according to step e) is carried out by means of liquid application. For this purpose, for example, molten polyurethane can be applied to the corresponding subsurface.

In one embodiment it can be provided that step a) is carried out by a method comprising the steps:
a1) providing a pourable carrier material, in particular a granulate;
a2) arranging the carrier material between two belt-like conveying means;
a3) forming the carrier material under the action of temperature while forming a web-like carrier;
a4) optionally compressing the carrier;
a5) treating the carrier under the action of pressure by use of a twin belt press;
a6) optionally cooling the carrier.

In this embodiment, a particularly advantageous method for producing the carrier can be enabled.

First, according to step a1) a pourable carrier material is provided. The carrier material serves as a basis for the production in particular of plate-shaped carriers for panels. With regard to the concrete material mixture, reference is made to the above statements.

In a particularly advantageous manner, the carrier material can be provided as a pourable solid or as a granulate, wherein the granulate depending on the material used merely by way of example may have a particle size in a range of $\geq 100$ μm to $\leq 10$ mm. A preferred pouring or distribution of the carrier material may have a deviation of the bulk density of $\leq 5\%$, in particular $\leq 3\%$.

According to step a2) the pourable, in particular granular carrier material is arranged between two belt-like conveying means. In detail, a lower belt-like conveying means is moved circumferentially and in a defined distance to the lower conveying means an upper belt-like conveying means is moved circumferentially. Thus, the carrier material may be applied onto the lower conveying means and then constrained by the lower and the upper conveying means.

Here, the belt-like conveying means may be at least partially made of Teflon or of polytetrafluoroethylene (PTFE). For example, the belts may be formed entirely of polytetrafluoroethylene, or belts may be used which are provided with an outer layer of polytetrafluoroethylene. In the latter case, for example, glass fiber reinforced plastic belts or steel belts comprising a coating of polytetrafluoroethylene can be used. The conveying means can pass through the entire device or may be interrupted and be configured as a plurality of conveying means.

In a further step, according to the step a3) the carrier material arranged between the belt-like conveying means is formed under the action of temperature or heat. In this step the carrier material or at least a portion thereof is melted or softened by the action of heat, whereby, for example, the granules can be made formable. In this state it can homogeneously fill the accommodation space formed between the conveying means and thus form a web-like carrier which can be further treated.

The thus formed web-like carrier can be compressed simultaneously to or after process step a3) according step a4). This step can in particular be carried out in a suitable press or roller. Thus, here a first compression of the web-like carrier takes place. In this step, the carrier substantially can already obtain its desired thickness such that in following processing steps only a slight compression needs to be carried out and thus the further steps may be implemented very gently, as will be explained in detail below. Herein, in particular, it can be ensured that the temperature of the carrier is cooled down sufficiently such that a suitable compressibility is enabled while achieving the desired result.

In a further step a5) now a further treatment of the carrier under the influence of pressure with use of a twin belt press is implemented. In this step, in particular the surface properties of the carrier can be adjusted or the thickness of the carrier can at least substantially be pre-adjusted. To this end, the previously compressed carrier can be treated under the influence of pressure, wherein in particular a low pressure can be selected such that this compression takes place only in a very small range. Thus, the design of the processing device in this step can be selected in particular depending on a desired adjustment of the compression, which may be particularly gently and effectively.

Here, in particular the use of a twin belt press can be advantageous, since with such a press particularly gentle compression steps are possible and moreover the surface quality or the thickness of the carrier can be set particularly effective and defined. Furthermore, in particular the use of a belt press enables high line speeds such that the whole process enables a particular high throughput. Moreover, for example, by providing pneumatic cylinders a particularly uniform and defined adjustable belt tension of the twin belt press can be enabled.

Herein, smoothing or adjusting the surface quality in this step may mean that, while the uppermost surface is smoothed, already introduced structures or pores, however, are not influenced or are only influenced in a defined region, so that these even after this step may be present in the desired manner, insofar this is desired. This can be enabled in particular by the use of a belt press with a suitable temperature profile and with suitable pressure values, or by means of a calender, as described in detail below.

Here, the method can be optimized in particular with regard to a temperature control.

For example, it may be preferably provided that the carrier is cooled during or prior to step a5), in particular below the melting point or the softening point of a plastic component of the carrier material. In other words, the carrier may be cooled prior to or within the twin belt press. In this case, cooling can be implemented only in a limited range, so that the carrier still has an elevated temperature compared to the room temperature (22° C.) but is below the preset elevated temperature and preferably and depending on the plastic material used, below the melting point or the softening point of the plastic material included in the carrier material. In particular, by cooling the carrier, cupping or the occurrence of blowholes or pores can be avoided such that the surface of the carrier can be of particularly high quality. Suitable temperatures for polyethylene, for example, are in a range of below 130° C., in particular below 120° C., such as in a range of ≥80° C. to ≤115° C., without being restricted thereto.

In an optional post smoothing process downstream of the twin belt press or even without post smoothing it is possible to set a temperature which is above the crystallization temperature of the plastic material. For example, in the case of linear polyethylene as a constituent of the carrier, heating to a temperature in a range of ≥100° C. to ≤150° C., for example 120° C., may be sufficient and appropriate.

Here, the crystallization temperature in the sense of the present disclosure is in particular a temperature to which the polymer must be heated in order to subsequently form crystals during the cooling process. In particular, the crystal formation begins during a cooling of the polymer at a temperature which may be below the melting temperature and, where appropriate, above the glass transition temperature. Accordingly, a heating to a temperature below the melting temperature of the respective plastic material or to a temperature below the melting temperature may be sufficient. In the case of linear polyethylene (LLDPE), for example, heating to a temperature in a range from ≥100° C. to ≤150° C., for example 120° C., may be sufficient. In the case of polypropylene, for example, heating to a temperature in a range of ≥160° C. to ≤200° C., for example, 180° C., may be sufficient.

In the further course, in a further step a6) subsequently the web-like carrier is optionally cooled. The carrier can be cooled in particular by providing a cooling device with defined cooling stages to a temperature which corresponds to the room temperature or merely by way of example is in a range of up to 20° C. thereabove. For example, a plurality of cooling zones may be provided to allow for defined cooling of the carrier.

After a cooling of the carrier produced, the carrier can initially be stored as an intermediate product in a web-like form or as individual plate-shaped carriers and the method can momentarily be finished. Preferably, however, further treatment steps follow, which may be realized, for example, without a grinding process, in particular in order to process the carrier provided so as to produce a finished panel, as is explained in detail below.

With respect to further technical features and advantages of the method described above, reference is made to the description of the decorative panel, to the figures and to the description of the figures.

Further advantages and advantageous embodiments of the subject matters of the disclosure are illustrated by the drawings and explained in the following description. It should be noted that the drawings have only descriptive character and are not intended in any way to limit the disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

FIGS. 1 to 5 show different embodiments of decorative panels. Identical or comparable components or features are designated by the same reference numerals.

Figure 1:
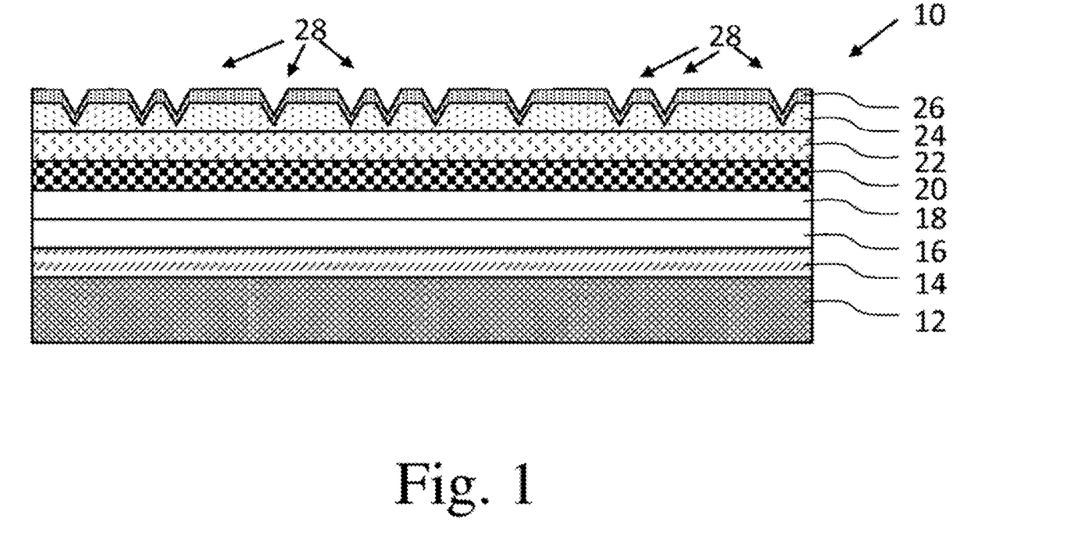
FIG. 1 shows the schematic configuration of one embodiment of a decorative panel according to the disclosure.

FIG. 1 shows a first embodiment of a decorative panel 10 according to the present disclosure. In this case, initially a particular plate-shaped carrier 12 is provided, which may be formed from a wood-based material, such as a WPC material. On the carrier 12 a decoration substrate 14 is arranged, on which according to FIG. 1 a first white layer 16 and a second white layer 18 are arranged. These serve as a direct carrier of the decorative layer 20. On the decorative layer 20 a stability layer 22 is provided which is made of polyurethane, wherein the stability layer 22 has a density of >0.8 g/cm$^3$. On the stability layer 22, in turn, a first protective layer 24 is provided, which is configured, for example, as a lacquer layer and provided with a structure 28. For example, the structure 28 is pressed into the first protective layer 24 and in conformity with the decorative layer 20. As a termination, a second protective layer 26 formed, for example, as a top-coat-lacquer, may be applied.

Figure 2:
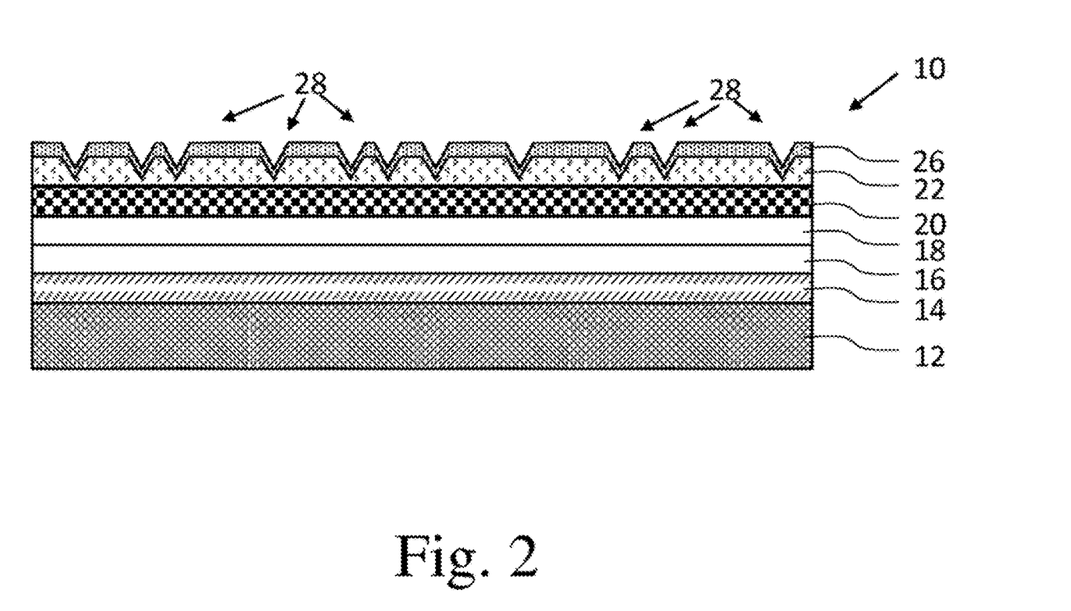
FIG. 2 shows the schematic configuration of another embodiment of a decorative panel according to the disclosure.

FIG. 2 shows a further embodiment of a decorative panel 10. This embodiment differs from the embodiment of FIG. 1 in that the first protective layer 24 has been dispensed with and the second protective layer 24 is disposed directly on the stability layer 22. It can be seen that the structure 18 is also present in the stability layer 22.

Figure 3:
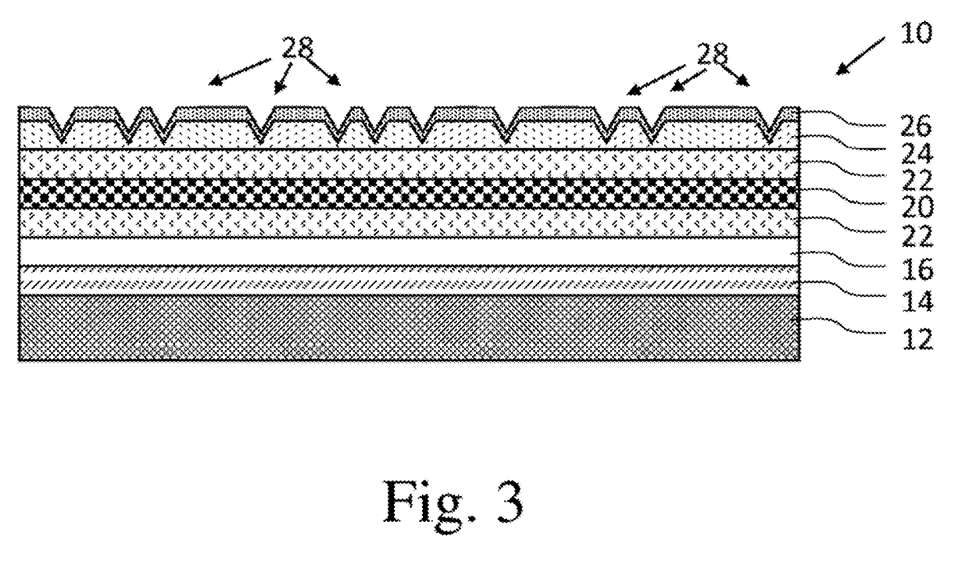
FIG. 3 shows the schematic configuration of another embodiment of a decorative panel according to the disclosure.

The embodiment of a decorative panel 10 shown in FIG. 3 differs from the embodiment shown in FIG. 1 in that the second white layer 18 has been replaced by a stability layer 22, which may additionally be provided and is present in white color. Optionally, the first white layer 16 can likewise be dispensed with.

Figure 4:
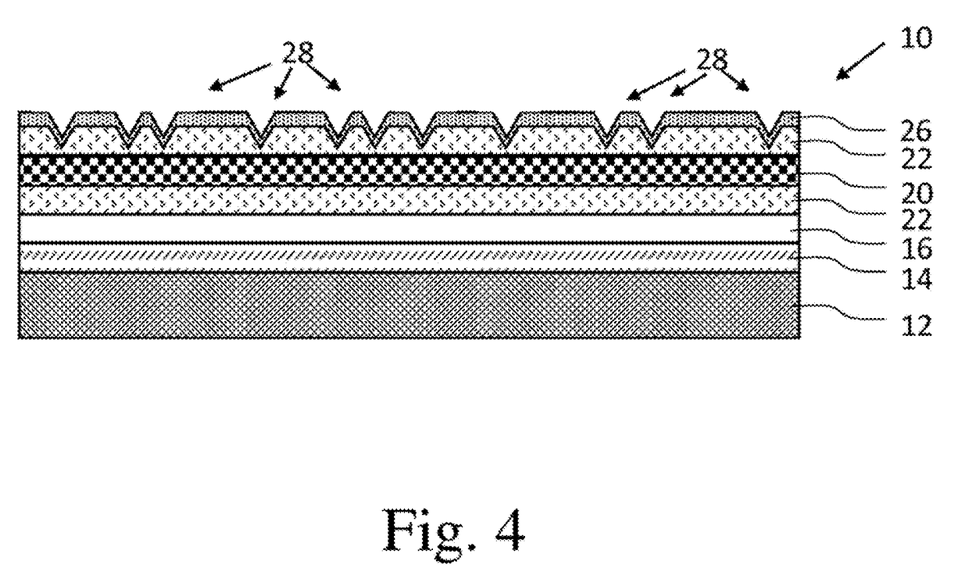
FIG. 4 shows the schematic configuration of a further embodiment of a decorative panel according to the disclosure.

The embodiment of a decorative panel shown in FIG. 4 differs from the embodiment shown in FIG. 2 in that the second white layer 18 has been replaced by an additional stability layer 22, which is also present in particular in white color. Optionally, the first white layer 16 can likewise be dispensed with.

Figure 5:
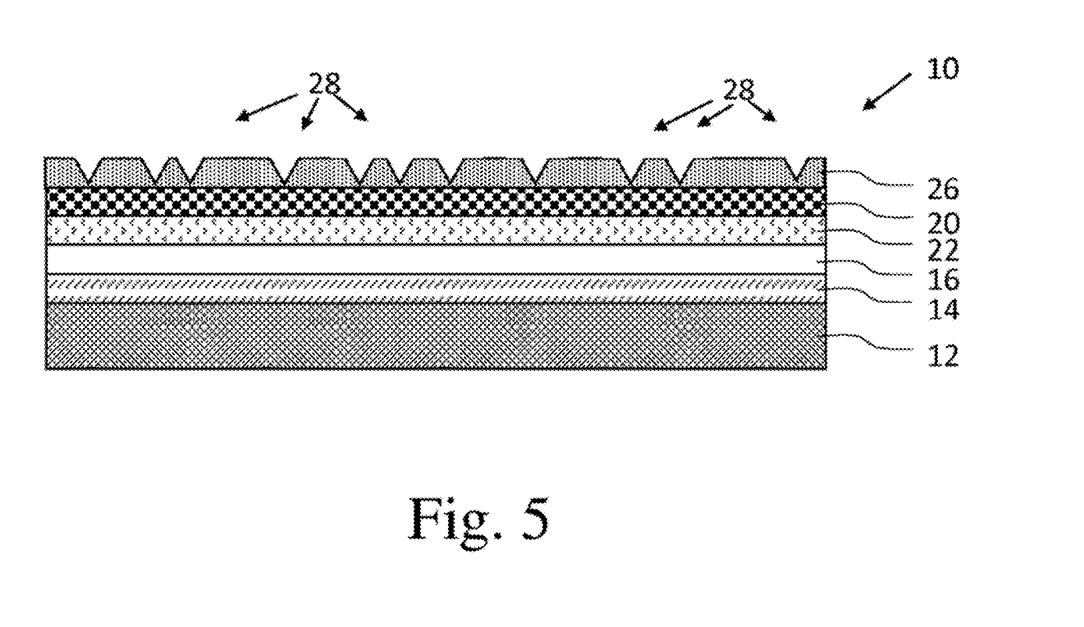
FIG. 5 shows the schematic configuration of another embodiment of a decorative panel according to the disclosure.

FIG. 5 shows a further embodiment of a decorative panel 10. In this embodiment, a stability layer 22 is arranged only between the decorative layer 20 and the carrier 12, wherein the stability layer 22 can in turn replace one, as shown in FIG. 5, or even both white layers 20, 22.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A decorative panel, comprising a layered structure including a plate-shaped carrier on which a decoration substrate and a decorative layer applied on the decoration substrate are provided, wherein the decorative panel further comprises in its layered structure at least one protective layer, and wherein the decorative panel comprises at least one stability layer in its layered structure, wherein the at least one stability layer is arranged directly adjacent to the decorative layer and the at least one protective layer, wherein the at least one stability layer comprises polyurethane, and wherein the polyurethane has a density in a range of $\geq 0.9$ g/cm$^3$ to $\leq 2$ g/cm$^3$, and wherein the at least one stability layer is formed by an application amount ranging from $\geq 40$ g/m$^2$ to $\leq 70$ g/m$^2$.

2. The decorative panel according to claim 1, wherein the at least one stability layer consists of a polyurethane layer.

3. The decorative panel according to claim 1, wherein the polyurethane is based on hexamethylene diisocyanate as a structural element.

4. The decorative panel according to claim 1, wherein the polyurethane of the at least one stability layer has a melting point or softening point of 150° C.

5. The decorative panel according to claim 1, wherein the at least one stability layer is provided with a surface structuring.

6. The decorative panel according to claim 1, wherein the plate-shaped carrier comprises a wood-based material, in particular a WPC material.

7. The decorative panel according to claim 1, wherein the plate-shaped carrier comprises talcum.

8. The decorative panel according to claim 1, wherein between the plate-shaped carrier and the decorative layer at least one white layer is arranged.

9. The decorative panel according to claim 1, wherein the at least one stability layer is applied by liquid application.

10. A method for producing a decorative panel, comprising the steps:
   a) providing a plate-shaped carrier;
   b) applying a decoration substrate on at least a portion of the plate-shaped carrier;
   c) applying a decorative layer replicating a decorative template onto at least a portion of the decoration substrate;
   d) applying a protective layer onto the decorative layer, wherein the method comprises the further step:
   e) applying at least one stability layer prior to one of the method steps c) or d), wherein the at least one stability layer comprises polyurethane, and wherein the polyurethane has a density in a range of $\geq 0.9$ g/cm$^3$ to $\leq 2$ g/cm$^3$, in an application amount ranging from $\geq 40$ g/m$^2$ to $\leq 70$ g/m$^2$.

11. The method according to claim 10, wherein step e) is carried out by liquid application.

12. A decorative panel, comprising a layered structure including a plate-shaped carrier on which a decoration substrate and a decorative layer applied on the decoration substrate are provided, wherein the decorative panel further comprises in its layered structure at least one protective layer and at least one white layer, and wherein the decorative panel comprises at least one stability layer in its layered structure, wherein the at least one stability layer is arranged directly adjacent to the decorative layer and the at least one white layer, wherein the at least one stability layer comprises polyurethane, and wherein the at least one stability layer has a density in a range of $\geq 0.9$ g/cm$^3$ to $\leq 2$ g/cm$^3$, and wherein the at least one stability layer is formed by an application amount ranging from $\geq 40$ g/m$^2$ to $\leq 70$ g/m$^2$.

* * * * *